Oct. 16, 1923.
J. M. C. SEMERY
PNEUMATIC WHEEL
Filed Feb. 4, 1919
1,470,938
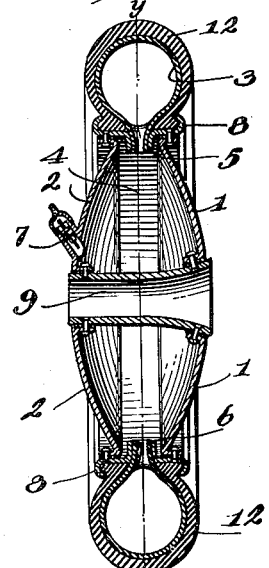
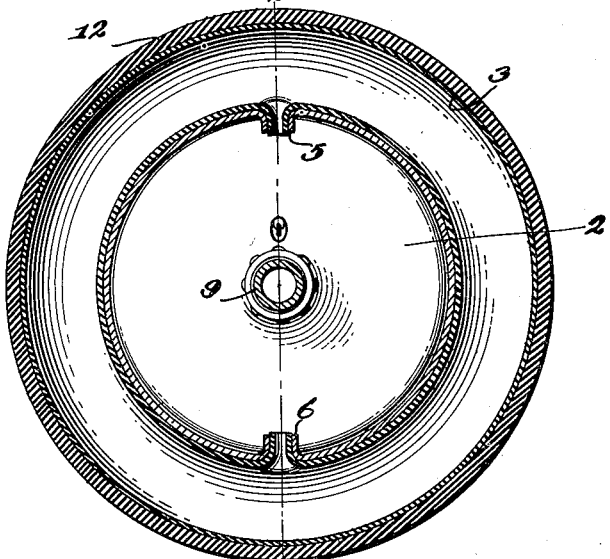
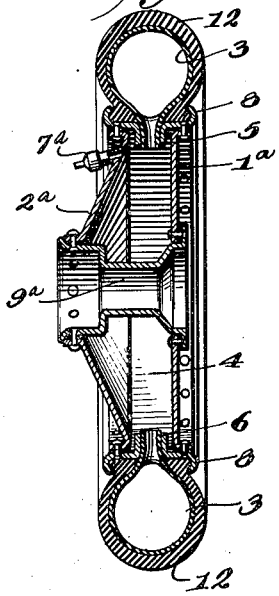
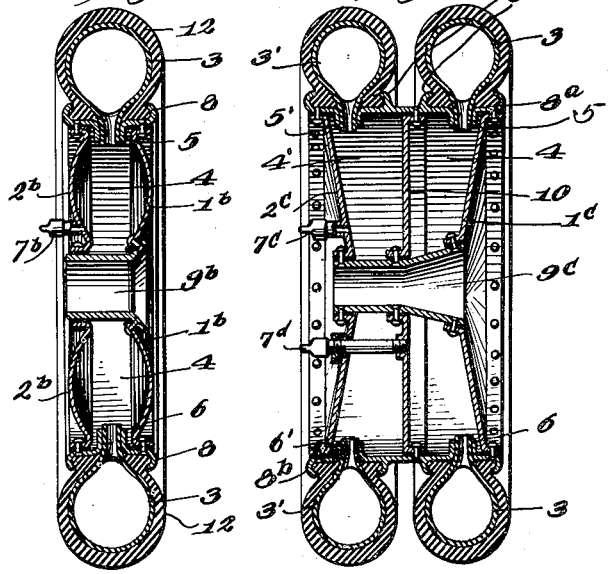
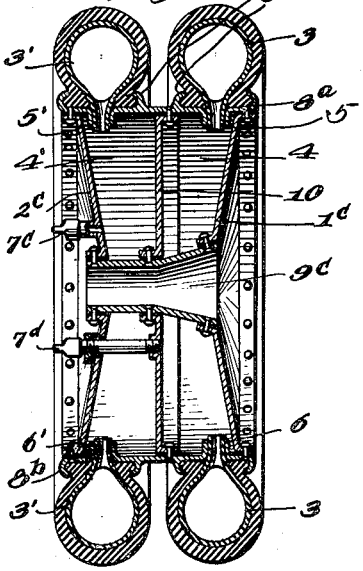
Inventor
J. M. C. Semery
By H. S. MacKaye
Attorney Patented Oct. 16, 1923.

1,470,938

UNITED STATES PATENT OFFICE.

JEAN MARIE CHARLES SEMERY, OF PARIS, FRANCE.

PNEUMATIC WHEEL.

Application filed February 4, 1919. Serial No. 275,039.

*To all whom it may concern:*

Be it known that I, JEAN MARIE CHARLES SEMERY, a citizen of the French Republic, residing at Paris, 5 Rue de l'Universite, in the Republic of France, have invented certain new and useful Improvements in Pneumatic Wheels; and I do hereby declare the following to be a full, clear, and exact description of the invention, such as will enable others skilled in the art to which it appertains to make and use the same.

The present invention relates to improvements in pneumatic wheels and the improved wheel comprises one or more chambers filled with compressed air in the body of the wheel in combination with the usual pneumatic tire which is in communication with the central air chamber or chambers.

The invention is illustrated in the accompanying drawings in certain preferred forms and in these drawings, Figure 1 is a transverse section of one form of wheel on the line $x-x$ in Figure 2, Figure 2 is a section in the plane of the wheel on the line $y-y$ in Figure 1, Figures 3 and 4 are sectional views similar to Figure 1 showing modified forms of wheel and Figure 5 is a similar section showing a duplicate form of wheel made in accordance with the invention.

In the form shown in Figures 1 and 2, the body of the wheel is formed of curved plates or discs 1 and 2 joined by the hub 9 and combined with the inner tube 3 within a pneumatic tire casing 12. The space 4 between the dished discs 1 and 2 forms an air chamber which communicates with the interior of the tube 3 through one or more openings at suitable intervals indicated in the drawings at 5 and 6. The usual valve for introducing the compressed air into the chamber 4 is shown at 7. The rim of the wheel is shown in section at 8.

In Figure 3 is shown a form of wheel in which the chamber 4 is enclosed by a flat disc $1^a$ and a second disc $2^a$ of a frusto conical form. These are joined by a modified form of hub $9^a$ and the valve for filling the compressed air is shown near the rim at $7^a$.

In Figure 4 the discs which form the wheel are double convex as shown at $1^b$ and $2^b$ and another modified form of hub is shown at $9^b$. Air is introduced into the chamber 4 through the valve $7^b$ located near the hub $9^b$.

In Figure 5 a duplicate wheel is shown in which air chambers 4 and 4' are separated by the common central disc 10 and communicate by openings 5, 5', 6, 6' with the inner tubes 3, 3'. The double rims are shown at $8^a$ and $8^b$. The outer walls of the air chambers are formed by inwardly dished discs $1^c$ and $2^c$ and the whole is joined by a hub $9^c$. The two chambers are respectively filled through the valves $7^c$ and $7^d$.

My invention covers the use of wheels made of any proper material, whether metallic or otherwise.

It will be seen that the volume of compressed air available is several times as great as with the ordinary pneumatic tire and the result will be an improved elasticity and a better deadening of shocks.

What is claimed is—

A pneumatic wheel comprising a hub, a rim, a casing on the rim, and discs connecting the hub and rim and forming therewith an air chamber adapted to contain compressed air, and a pneumatic tube mounted in the casing on said rim, the said rim and tube having aligned apertures to provide for communication between the air chamber and the tube.

In testimony whereof I affix my signature in presence of two witnesses.

JEAN MARIE CHARLES SEMERY.

Witnesses:
LOUIS MAYER DALTROF,
JOHN F. SIMONS.